(No Model.)
R. THEW.
DEVICE FOR TEACHING MUSIC.
No. 510,302. Patented Dec. 5, 1893.
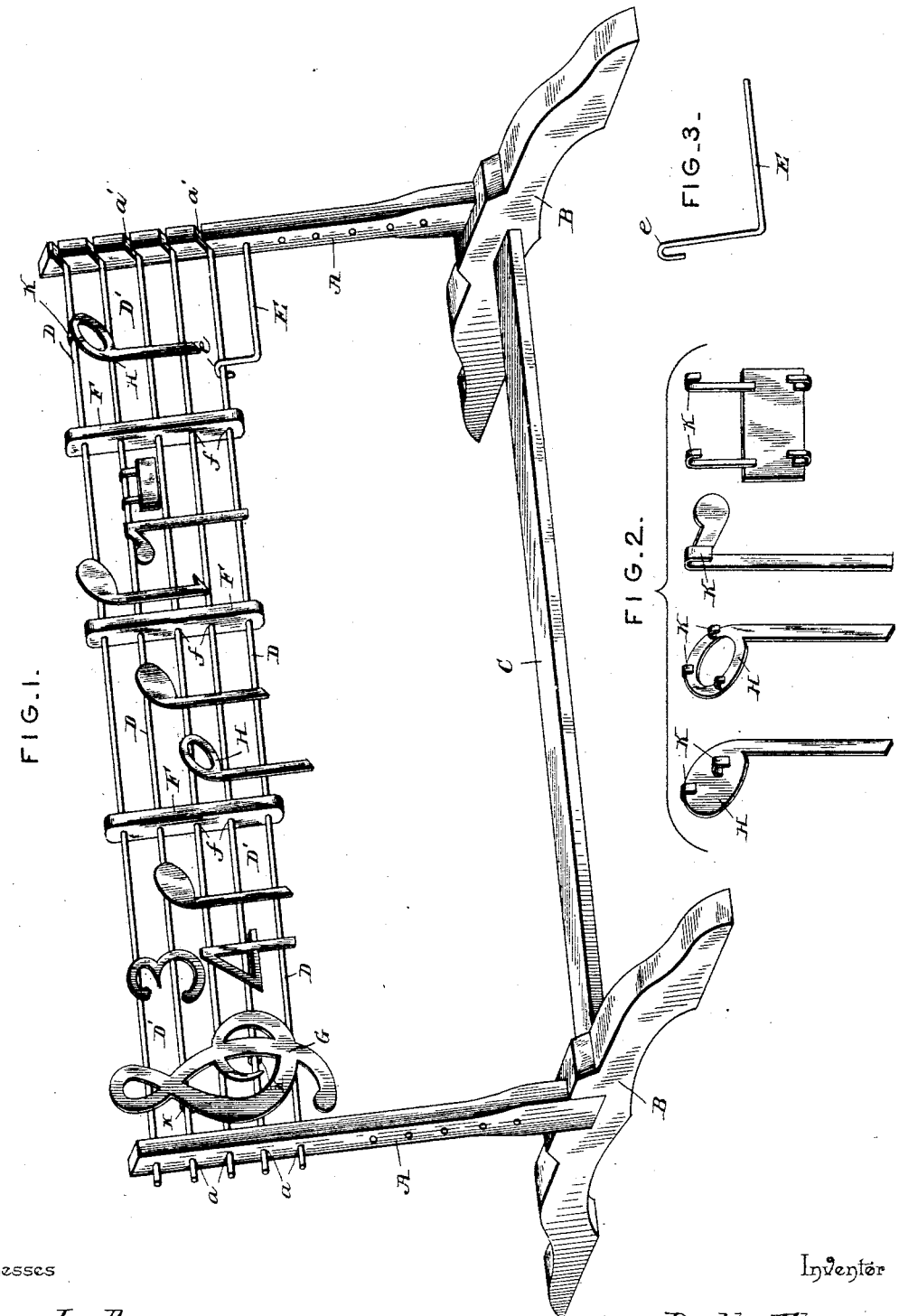
Witnesses
Harry L. Amer.
Inventor
Ruth Thew.
By her Attorneys,
C. A. Snow & Co.

UNITED STATES PATENT OFFICE.

RUTH THEW, OF LA RUE, OHIO.

DEVICE FOR TEACHING MUSIC.

SPECIFICATION forming part of Letters Patent No. 510,302, dated December 5, 1893.

Application filed January 16, 1893. Serial No. 458,516. (No model.)

*To all whom it may concern:*

Be it known that I, RUTH THEW, a citizen of the United States, residing at La Rue, in the county of Marion and State of Ohio, have invented a new and useful Device for Teaching Music, of which the following is a specification.

The invention relates to a device for teaching music designed for use in the instruction of primary pupils in the elementary or rudimental principles of music, the objects in view being to provide adjustable devices to represent the staff, leger-lines, bars, &c., and detachable and movable characters to represent the clefs, notes, rests, signatures, accidentals, &c.

The staff in music is designed to represent, to the eye of the beholder, location or position, and indicate the relative pitches of tones represented by the note-signs placed upon the various degrees thereof, but to a beginner it is difficult to make clear the fact that a certain sign or character placed upon a particular degree of the staff represents a different tone from that which the same sign or character represents if placed upon another degree of the staff, and hence the difficulty of teaching this principle by means of a chart having the notes permanently placed thereon. By means of material characters arranged upon a material staff, a note-sign may be placed upon a certain degree of the staff, and, after a musical tone has been assigned thereto by means of the voice or an instrument, the same sign may be changed to another degree of the staff and the relative tone belonging thereto given, thus combining the evidences of the eye and the ear in such a manner as to impress upon the pupil the importance and utility of the staff as an indicator of pitch and the analogy between the same and a ladder, and hence the reason for terming a staff a musical ladder.

Further objects and advantages of my invention will appear in the following description, and the novel features thereof are particularly pointed out in the appended claims.

In the drawings: Figure 1 is a perspective view of a device embodying my invention, with a few of the signs or characters arranged thereon to show the manner of attachment. Fig. 2 shows a number of signs and characters detached from the staff, indicating the means employed for attachment thereto. Fig. 3 is a detail view, detached, of the character employed to represent a leger-line.

A A represent vertical standards, provided at their lower ends with feet B, and connected by the horizontal brace C. The standards, A, are provided near their upper ends with perforations $a$ and notches $a'$, respectively, in which are fitted the horizontal rods, D D, which represent the lines of the staff. These rods are spaced apart to form intermediate spaces, $D'$, which represent the spaces between the lines of the staff. The standards may be provided with any desired number of perforations $a$ and notches $a'$, so that two staffs may be represented at one time, if desired.

In Figs. 1 and 3 a leger-line E is represented, the manner of attaching the same to the frame being indicated in Fig. 1, in which the end of the wire representing such leger-line is inserted in a perforation in the standard and a small hook, $e$, connected to the free end of such wire is engaged with the rod representing the lowermost line of the staff.

F F represent vertical bars, provided with perforations $f\ f$, spaced apart to correspond with the spaces between the perforations or sockets in the standards, whereby the rods D extend therethrough and maintain the bars in position upon the staff. The bars may be moved laterally to occupy any desired positions upon the rods to indicate measures, (namely, the spaces between the bars,) of any desired lengths.

G represents a clef character, which in common with the note-signs, H, and other characters (shown in detail in Fig. 2) is provided upon its rear side with attaching ears, K K, which, engaged with the rods D, support such characters in the desired positions upon the staff.

By means of the common signs and characters, all of which are struck from sheet-metal, card-board, celluloid, or other light and thin material, any desired strain or sequence may be represented.

The value of the adjustablity of the parts of the frame and of the other characters employed in musical notation in connection with the instruction of primary pupils in the rudimental principles of the art will be appreciated by all those skilled therein, and further description of the capabilities and advantages of my invention is unnecessary.

It will be understood that changes of form, proportion and the minor details of construction may be resorted to without departing from the principles or sacrificing any of the advantages of the invention.

Having thus described my invention, what I claim, and desire to secure by Letters Patent, is—

1. In a device of the class described, the combination with independent horizontal rods representing lines, of signs or characters provided with suspending ears to engage the rods, such ears being arranged at different points upon the signs or characters to sustain the latter upon or between the rods according to the ear which is engaged therewith, substantially as specified.

2. In a device of the class described, the combination with horizontal rods representing lines, of bars provided with perforations to receive such rods and adapted to slide laterally thereon, and attachable signs and characters representing notes, clefs, &c., substantially as specified.

3. In a device of the class described, the combination with standards provided with perforations, of rods representing lines fitted in such perforations, and signs and characters provided with means for attachment to said rods, substantially as specified.

4. In a device of the class described, the standards, rods attached thereto, short wires fitting in perforations in the standards above or below said rods and provided with hooks to engage the rods, and attachable note-signs, &c., substantially as specified.

In testimony that I claim the foregoing as my own I have hereto affixed my signature in the presence of two witnesses.

RUTH THEW.

Witnesses:
G. N. MYERS,
C. S. LIPPINCOTT.